United States Patent

Birkin

[11] 3,888,437
[45] June 10, 1975

[54] VEHICLE CONTROL SYSTEMS
[75] Inventor: Michael S. Birkin, Derby, England
[73] Assignee: British Railways Board, London, England
[22] Filed: June 11, 1973
[21] Appl. No.: 368,790

[30] Foreign Application Priority Data
June 14, 1972 United Kingdom........... 27869/72

[52] U.S. Cl.......... 246/63 A; 246/63 R; 246/122 R
[51] Int. Cl........................... B61l 1/10; B61l 27/00
[58] Field of Search.... 246/122 R, 124, 63 R, 63 A, 246/63 C, 30, 187 B

[56] References Cited
UNITED STATES PATENTS

| | | | |
|---|---|---|---|
| 3,268,727 | 8/1966 | Shepard | 246/122 R |
| 3,576,524 | 4/1971 | Ogilvy | 246/63 C |
| 3,731,086 | 5/1973 | Smith | 246/63 C |
| 3,774,025 | 11/1973 | Auer | 246/187 B |

FOREIGN PATENTS OR APPLICATIONS

| | | | |
|---|---|---|---|
| 1,074,602 | 7/1967 | United Kingdom | 246/187 B |

Primary Examiner—M. Henson Wood, Jr.
Assistant Examiner—Reinhard J. Eisenzopf
Attorney, Agent, or Firm—Pollock, Philpitt & Vande Sande

[57] ABSTRACT

A vehicle control system in which a vehicle moves along a fixed pathway, a plurality of uniquely identifiable transponder devices are positioned adjacent the trackway means are carried by said vehicle for interrogating each transponder passed by the vehicle to determine its identity and communication means are provided for transmitting this identity to a central control which having determined the location of each vehicle under its control thereafter issues instructions to the vehicles to control their running speed and spacing.

8 Claims, 6 Drawing Figures

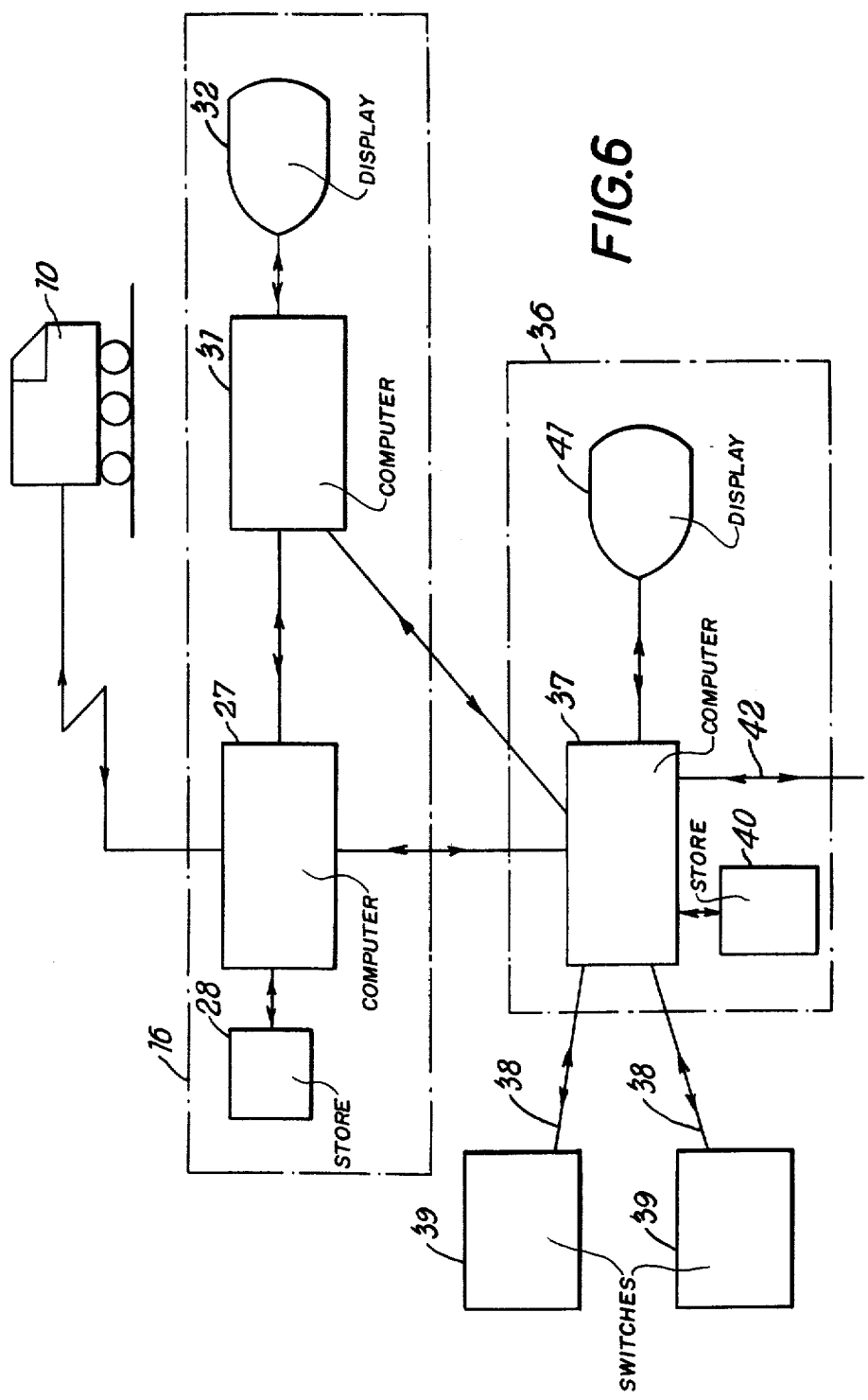

VEHICLE CONTROL SYSTEMS

This invention relates to a vehicle control system. More particularly it relates to such a system in which the location, direction of travel and the speed of travel of a vehicle moving along a fixed pathway can be monitored and controlled.

For the efficient and safe running of any guided land transport system the following primary parameters must be known and controlled within given levels of quantisation and tolerance. 1. The location of the vehicles in the system. 2. The actual speed of the vehicles. 3. The actual direction of motion of the vehicles. 4. The desired speed of the vehicles. 5. The desired direction of motion of the vehicles.

These in turn depend upon the following secondary parameters which also must be known within given levels of quantisation and tolerance. 1. The identity of the vehicles. 2. The track constraints on speed, that is curves and permanent way work etc. 3. The vehicle constraints, that is riding stability, weight, power availability, variation in length when formed as a train, acceleration and deceleration abilities. 4. Route setting. 5. Passenger and freight constraints, that is station stops, loading and unloading times, comfort of ride. 6. Detection of any obstruction to the progress of the vehicle. 7. If the vehicles are connected together, the length of the train must be known.

According to the present invention there is provided a vehicle control system comprising a vehicle arranged to move along a fixed pathway, a plurality of uniquely identifiable transponder devices positioned adjacent the trackway, means carried by said vehicle for determining the identity of each transponder passed by the vehicle and communication means for transmitting this identity to a central control.

Preferred embodiments of the present invention will now be described with reference to the accompanying drawings in which:

FIG. 6 is a diagrammatic representation of an extended version of the vehicle control system.

Figure 1:
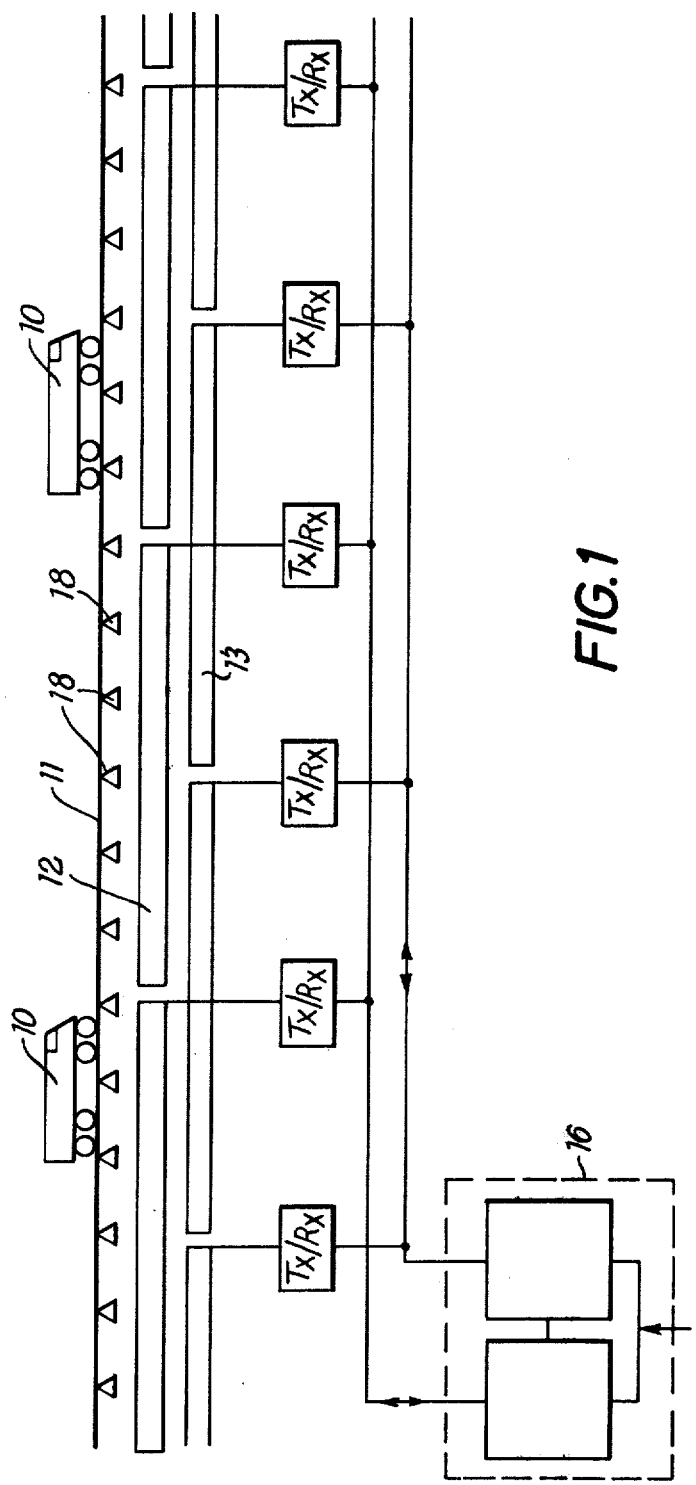
FIG. 1 is a diagrammatic representation of a vehicle control system
Figure 2:
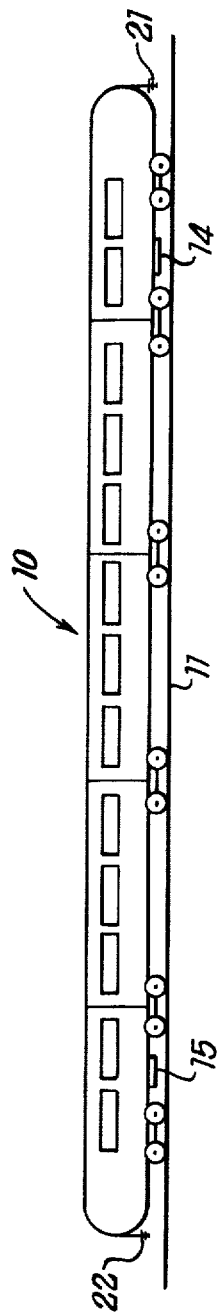
FIG. 2 is a side view of a railway train showing the position of the communication antennae and of the transponder interrogating antennae.

As shown in FIG. 1, a vehicle 10, such as a railway train moves along a fixed pathway 11. Two series of duplicated inductive loops 12 and 13 are laid in the path of the vehicle 10, which carries a pair of antennae 14 and 15 (FIG. 2) which become inductively coupled with the loops 12 and 13 respectively. Signals from a centralized command center 16 are fed to the loops 12 and 13 and are picked up by the antennae 14 and 15 and passed to control equipment 17 carried by the vehicle. The loops 12 and 13 are duplicated to improve availability of the system. A series of uniquely programmed transponders 18 are positioned at intervals adjacent the pathway 11. These transponders are interrogated by equipment 19 and 20 carried at each end of the moving vehicle. The identity signal from each transponder 18 is picked up by antennae 21 and 22 connected to the equipment 19 and 20.

Figure 3:
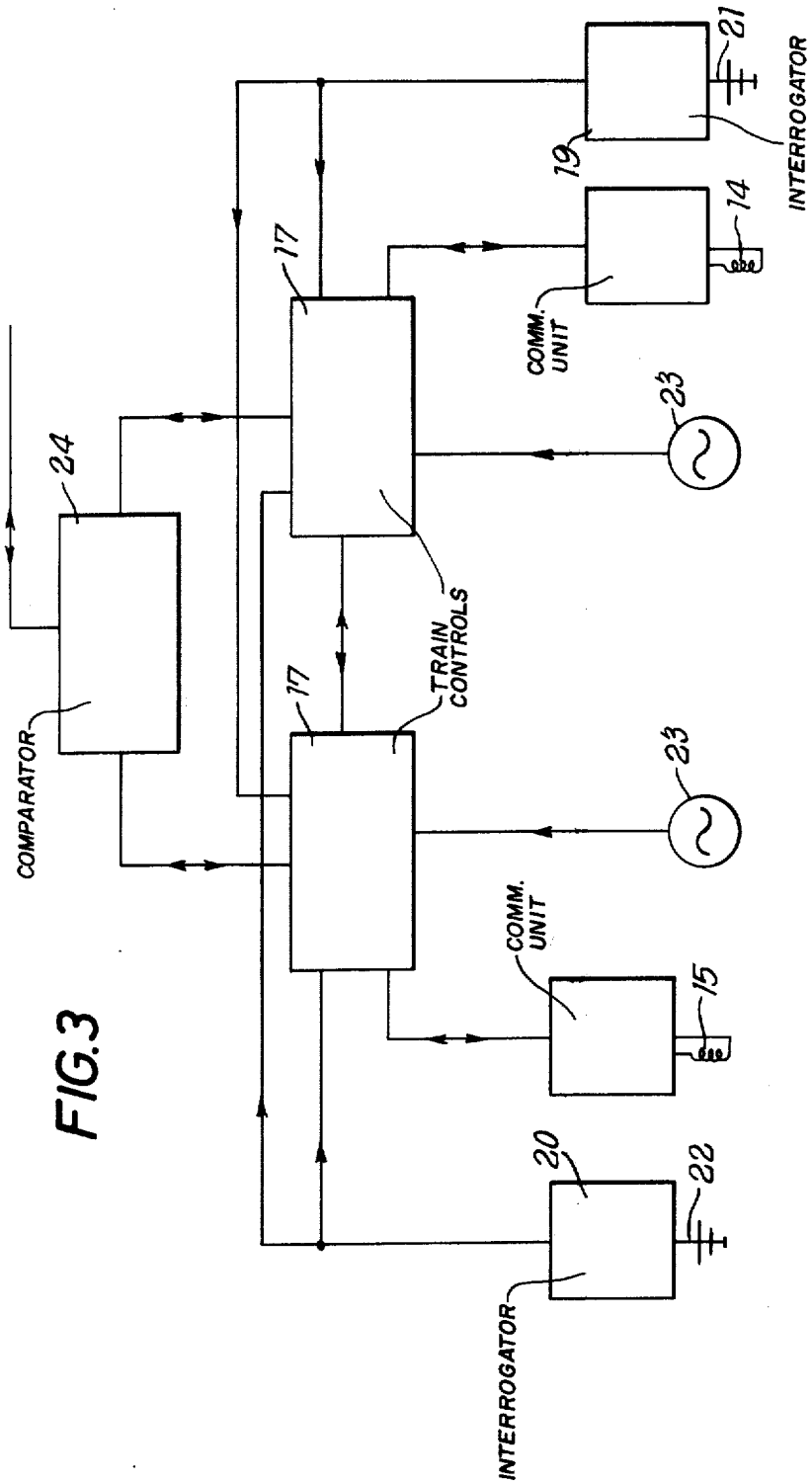
FIG. 3 is a block diagram of the vehicle mounted equipment.

The equipment carried by the train is shown in FIG. 3 and includes the communication antennae 14 and 15, the two train control equipments 17 and the two transponder interrogator devices 19, 21 and 20, 22. Information as to vehicle speed may be derived from tachometers 23.

The information from the duplicated vehicle control equipment 17 is passed to a comparator 24 and is acted upon only if both sets of control equipment are providing the same information.

The principles of operation are as follows: At the terminal stations a train 10 that is ready to enter under control of the system advises the centralised command center 16 of its identity and its availability to be moved away from the terminal under automatic control. If there is an available path for the train then the centralised command center gives an instruction to the train to start and gives to it a target speed and distance. Once trains have entered under the command of this centralised system they are regularly interrogated (for example ten trains per second) as to the manner in which they are performing, their position and direction of motion. Then any corrections necessary are made to keep them running under safe control. The position of the train is determined by the use of the uniquely programmed transponders 18 laid in the track at intervals (for example 200m) these being interrogated by the equipment 19 and 20 mounted at either end of the train. If information is returned via the communication link 12/14 and 13/15 as to the identity and sequence of detection of these transponders 18 it is then possible to determine the position and direction of motion of the train in question. The transponder interrogator 20 at the rear of the train will also act as an electronic tail lamp providing that the train is complete and also allowing the position of the rear of the train to be determined. Failure of any of the transponders 18, which will be detectable at the command center 16, will only result in a greater spacing being required between trains. The message sequence being that the centralised command center 16 issues a search and interrogation command addressed to a particular train, this train then replies with its position, speed, direction of motion and confirms its identity. A further transmission is then made to the train giving any necessary corrections and confirmation that this has been received by the train is sent back. The centralised command centre 16 then communicates with the next train etc., until all of the trains under its care have been called and a reply given, the sequence is then repeated.

Figure 4:
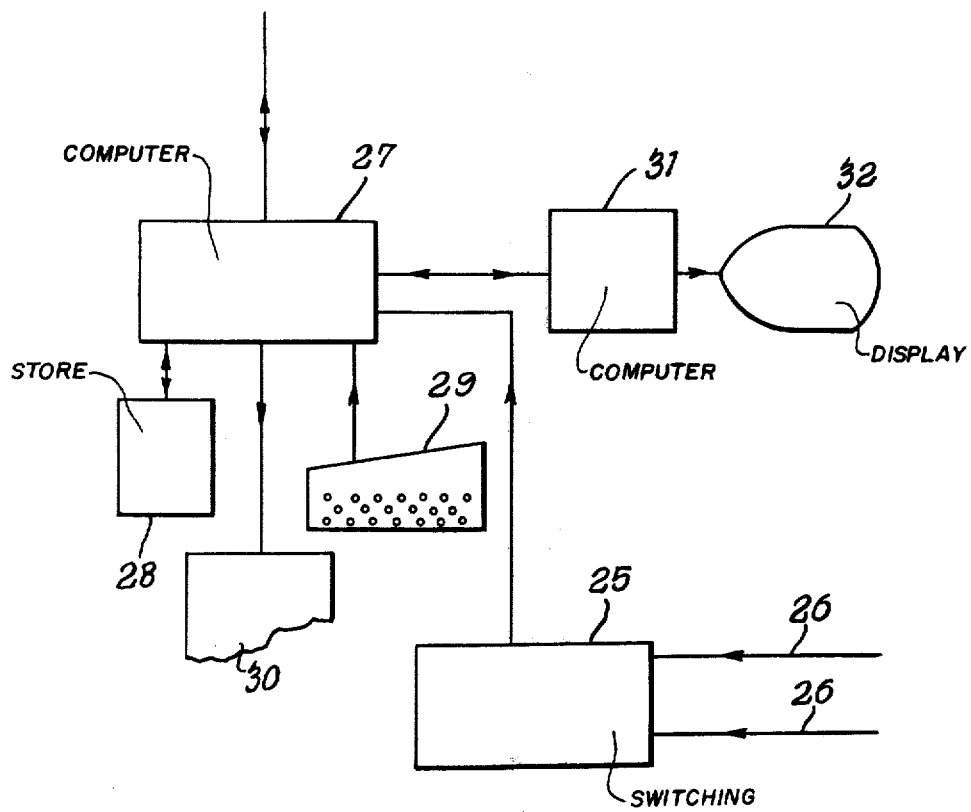
FIG. 4 is a diagrammatic representation of a central command center.

FIG. 4 shows apparatus of the command center 16 in greater detail.

Information regarding the position of all the track points or switches in the area under the control of the particular command center, is fed into a telemetry controller 25 via a series of inputs 26. This information is passed to a central computer 27.

Additional information, which will enable the computer 27 to make decisions regarding the running of each of the vehicles 10 under its control, is passed to it from a storage facility 28 and a keyboard 29. Information regarding the identity, position and speed of each vehicle 10 is derived from the train borne equipment as described above and again is fed into the computer 27.

On the basis of all the information available to it, the computer 27 then issues appropriate command instructions to each of the vehicles 10 as described. A printout 30 is connected to the computer 27 to provide a record of all instructions issued by it.

A second computer 31 also receives the output of the computer 27 and carries out a first-order check that this output is in order to check that computer 27 is operating correctly. This computer 31 is also linked to a visual display unit 32 which may utilize a colour video display from which the system operators can oversee the operation of the equipment and observe the position and route setting of each of the vehicles 10 under the control of the system.

In the event of a train not replying or failing to respond to a command signal, information is given to the following trains to be stopped. Fail safe equipment on the fault train will notice the lack of transmission and an automatic stop will be made to the train. In addition to the data transmission channels, a voice channel could be provided possibly either by some for of guided radio or inductively, which would allow if necessary the train to be moved under manual control under driving on sight conditions. As the position of each train, its identity, speed and direction of motion are known at the centralised command center 16 it will be possible to regulate the movement of the trains such that it will not be essential for any physical trackside indication of block section to be given. It will in fact be possible to vary at will the length of the block sections by the central command point in order to exactly match the parameters of the trains in question. It may however be necessary to provide some form of primitive colour light signalling for use under emergency conditions or when engineering work is in progress.

Figure 5:
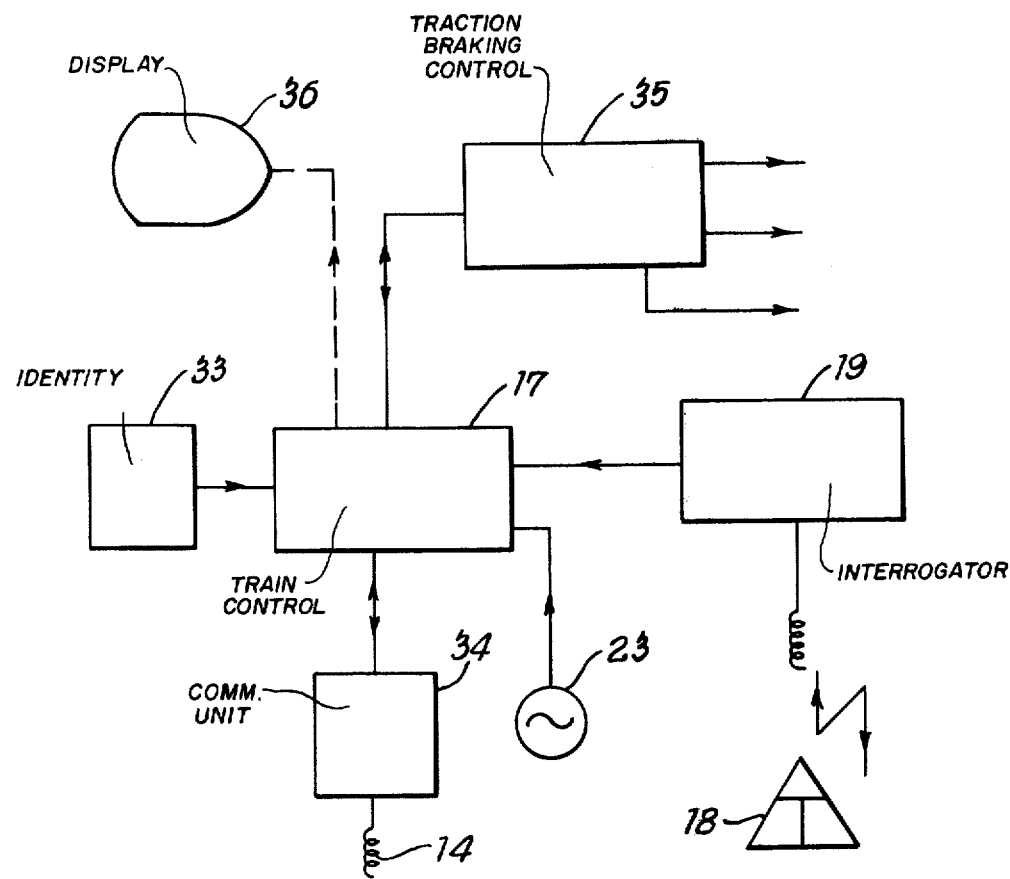
FIG. 5 is a block diagram showing a simplified version of the vehicle mounted equipment.

FIG. 5 shows a simpler version of the vehicle borne equipment suitable for single vehicle use for which it is not necessary to prove completeness of the train. A vehicle control unit 17 receives information as to identity of the transponder 18 just passed, by way of the transponder interrogating equipment 19. Information as to vehicle speed and direction is available in known manner from the phase-discriminating tachometer 23. The vehicle identity is available from a unit 33.

The information as to transponder identity, vehicle speed and vehicle identity is passed to a transmitter receiver unit 34 which is connected to antenna 14, and is passed to the control center 16 via the loop 12 as described. The control commands from the control center 16 are similarly picked up by antenna 14 from loop 12 and passed to the unit 17.

The control unit 17 subsequently issues appropriate instructions to a unit 35 which operates the vehicle power control to increase or descrese the traction power as necessary, the vehicle brakes and the vehicle running gear. A visual display of the commands issued by the unit 17 can be made available on a display unit 36 if required.

FIG. 6 shows an outline diagram of an extension of the system just described in which the control center 16 is combined with a strategic control center 36.

A computer 37 is linked via lines 38 to all of the track points or switches 39 in the area under its control. This link is such that the computer 37 can set these points or switches 39 to the appropriate position on the basis of the desired route to be followed by each of the vehicles 10 under the overall control of the system.

Information regarding the desired running timetable and route of all the vehicles 10 is fed into the computer 37 from a store 40.

Information regarding the identity, actual location and speed of all of the vehicles is derived from the computer 27 and on the basis of all this information, computer 37 issues strategic commands back to the computer 27 ordering it to modify the running of various ones of the vehicles 10 if necessary. This will only be obeyed by computer 27 if it considers the commands to be safe. Commands are also sent out to the various points or switches 39 to set the necessary routes for the vehicles 10.

A visual display in the form of a mimic diagram of the route area under control of the system, is made available on a display unit 41 which also may be a colour video display so that the system operators can keep a visual check on the decisions being made by the system.

With a double track railway and a control system as outlined it will be possible to signal both lines for bi-directional working and to revert to single line working with fully automatic operation if the circumstances warrant such as due to train or track failures or due to engineering work being in progress on one of the lines. The extent of this single line working depending upon the occurrence of point work which will enable crossings to be made from one running line to the other.

Although the system out-lined describes the use of an induction communication link for the communication means to and from the command center 16 and the vehicle 10, by way of the loops 12 and 13, other means such as radiating cable, directed wave, UHF or SHF repeater systems, as well as free space radio may be used. The reason for this is that unlike many other known train control systems the transmission circuit for this system is omnibus and the vehicles recognize their own uniquely addressed messages.

I claim:

1. A bi-directional vehicle control system for generating information related to the location, direction, and velocity of a vehicle adapted to move along a fixed path which system operates regardless of the direction of vehicle motion along said path, said system comprising,
  a plurality of uniquely identifiable transponder means positioned at known locations adjacent said path,
  first means carried by said vehicle at one extreme end thereof for determining the identity of each transponder means passed by said first means,
  second means carried by said vehicle at another extreme end thereof for determining the identity of each transponder means passed by said second means,
  radiating cable communication means located adjacent said fixed path, and
  vehicle carried communication means responsive to said first and second means and coupled to said radiating cable communication means for transmitting the identity of each transponder means passed by either said first or said second means to said radiating cable communication means.

2. The system of claim 1 in which said communication means includes an inductive loop laid in said pathway and said vehicle carried communication means includes means for inductively coupling to said loop.

3. The system of claim 1 which further includes, a central control means including communication means coupled to said radiating cable communication means for receiving said transmissions, and vehicle direction determining means responsive to said communication means for determining vehicle direction by the sequence of uniquely identifiable transponder means passed by said vehicle.

4. A system of claim 3 in which said central control means further includes:

vehicle speed determining means responsive to said communication means for determining vehicle speed from the delay between detection of any transponder means by said first and second means carried by said vehicle.

5. A system of claim 3 which further includes:

vehicle carried identification means, said vehicle carried communication means responsive to said identification means for transmitting said identification.

6. The system of claim 5 in which said central control means is responsive to vehicle location and generates instructions to control operation of said vehicle, said communication means transmitting said instructions to said vehicle.

7. The system of claim 6 wherein said central control means includes:

means identifying the condition of all pathway switching areas.

8. The system of claim 7 wherein said central control means includes means storing information respecting a desired operating time table for said vehicle.

* * * * *